May 28, 1940.   H. S. TURNER   2,202,069

THERMOSTAT

Filed June 24, 1936   2 Sheets-Sheet 1

WITNESSES
Ralph S. Voorhees
William L. Tucker

Hubert S. Turner
INVENTOR

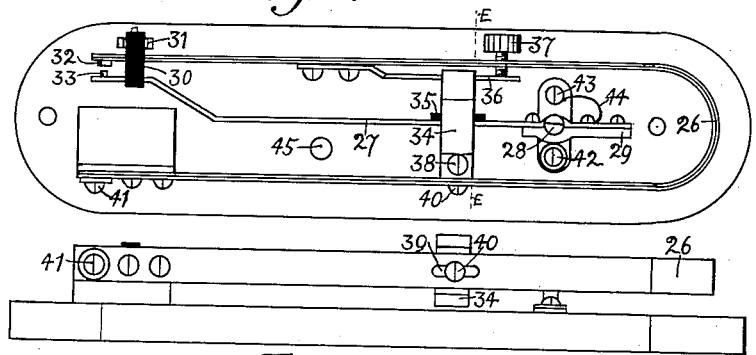

Patented May 28, 1940

2,202,069

UNITED STATES PATENT OFFICE 2,202,069

THERMOSTAT

Hubert S. Turner, New York, N. Y.

Application June 24, 1936, Serial No. 86,998

4 Claims. (Cl. 200—138)

The thermostat of the present invention is applicable for use with any temperature control device or system, though for a description of the preferred one, as well as a description of the useful purposes served by some of the novel features of the present invention, reference is had to my co-pending application, Serial Number 29,270, filed July 1, 1935. This thermostat is especially adapted to those uses where a super-senstive thermostat is indicated.

Means are provided, whereby if the thermostat is adjusted to close a circuit at a predetermined point, it will open it as soon as the temperature of the controlled area reverses its rise or fall, without waiting for the mentioned predetermined point first having been again reached. The thermostat adjustment can be such that a rise or fall in temperature between set points will close an electrical circuit, while if the rise or fall continues beyond another set point, the circuit will be opened, or will maintain the circuit closed, when the mentioned temperature reverses itself, until the second mentioned set point is reached. The thermostat can be provided with means for a different night temperature, without any mechanical adjustment being made at the thermostat by manual or automatic means.

Fig. 5 is a plan view of a further modification of the invention;

Fig. 6 is a side elevation of Fig. 5;

Fig. 7 is a section on the line E—E of Fig. 5;

Fig. 8 is a plan view of a still further modification;

Fig. 9 is a side elevation of Fig. 8;

Fig. 10 is a section on the line F—F of Fig. 8, and

Fig. 11 illustrates an additional modification.

Figure 1:
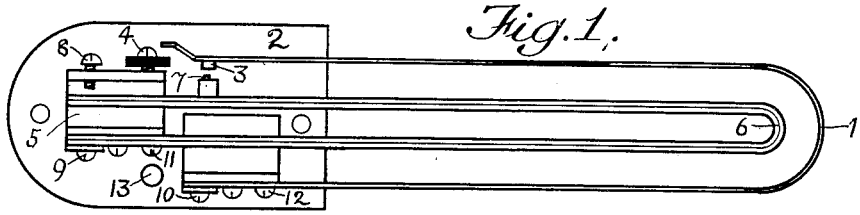
Fig. 1 is a plan view of one modification of the invention.
Figure 2:
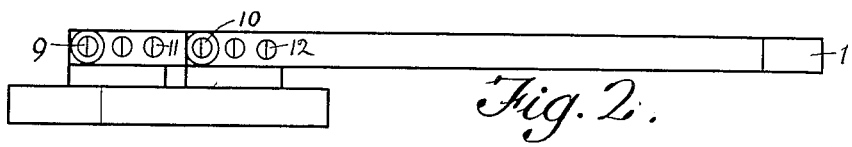
Fig. 2 is a side elevation of Fig. 1.

In Figs. 1 and 2, a strip of thermostatic material 1 is attached rigidly at one end to an insulating block 2. This strip is, preferably doubled back on itself, as shown. The free end of this strip bears an electrical contact 3 and the downward movement of this end is limited by the insulating nut on adjusting screw 4, which is threaded into bracket 5. Another strip of thermostatic material 6 is associated with strip 1. Strip 6 has a distortion characteristic slower than strip 1; an effect which can be obtained by making strip 6 thicker or wider, or both thicker and wider, if made of the same material as strip 1. Strip 6 is also attached rigidly at one end to insulating block 2, but is not in electrical contact at that end with strip 1. Strip 6, near its free end, has an electrical contact 7, which is adapted to engage contact 3. The upward movement of strip 6 is limited by adjusting screw 8, threaded into bracket 5. Due to the differences in characteristics mentioned, strip 1 will distort at its free end, for any given temperature change, quicker and further than strip 6. Both strips are represented in the drawing so that a fall in temperature of the air surrounding them will distort their free ends downward. When a cooling system is desired, the strips would be reversely mounted. Washered screws 9 and 10 are adapted for electrically connecting the wires from the device controlled by the thermostat. Adjusting screws 11 and 12 vary the tension and position of strips 1 and 6. A hole 13 in insulating block 2 is for the passage of the wires to be connected to screws 9 and 10.

Figure 3:
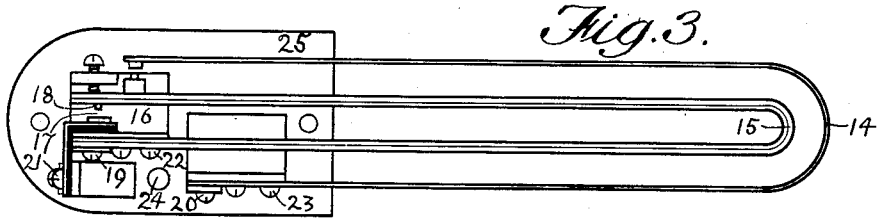
Fig. 3 is a plan view of another modification of the invention.
Figure 4:
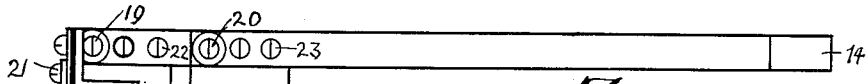
Fig. 4 is a side elevation of Fig. 3.

Figs. 3 and 4 illustrate a similar type of thermostat, the two strips 14 and 15 corresponding to 1 and 6, respectively. There is no adjusting screw, such as 4, to limit the downward movement of strip 14, and bracket 16 bears an electrical contact 17, insulated from the bracket, which is adapted to engage contact 18 on strip 15. Washered screws 19, 20 and 21 are for electrically connecting the wires from the device controlled by the thermostat. Adjusting screws 22 and 23 vary the tension and position of strips 14 and 15. A hole 24 allows the passage of the connected wires.

Figs. 5, 6 and 7 illustrate an alternative manner of obtaining the quick opening of the thermostat controlled circuit, when the temperature of the controlled area changes its direction. Thermostatic or bimetallic strip 26, corresponds to strips 1 and 14 in Figures 1 and 4. Instead of using another bimetallic strip, such as 6 or 15, a switch lever 27, of springy material, is used. Lever 27 moves freely on pivot 28 and counterweight 29 is such that the weight of lever 27, to the left of pivot 28, is almost, but not quite, balanced. The free end of lever 27 moves upwards in saddle 30 which is of insulating material. A point on the top of adjusting screw 31 holds saddle 30 in position. Electrical contacts 32 and 33 are engaged when lever 27 moves upward and when the upper arm of strip 26 moves downward. A spring clip 34 is mounted at some point on the lower arm of strip 26 to the left of pivot 28. Clip 34 is preferably V shaped and is adapted to engage insulating piece 35, whenever the lower arm of strip 26 distorts upward, thereby forcing up lever 27 and engaging contacts 32 and 33. Whenever the lower arm of strip 26 moves upwards, the free end of the upper arm also moves downward and the described engagement of contacts 32 and 33 is hastened. The position of spring piece 36 is adjusted by screw 37 and is adapted to enter the upper part of clip 34 and as it is wider than insulating piece 35, the latter is released from engagement with the clip. Fig. 7 shows clearly the relative widths of 35 and 36 and the form of clip 34, which is shown exaggerated in size and form for sake of clearness. An adjusting screw 38 allows the two sides of clip 34 to be adjusted so as to engage piece 35 at any predetermined point. Clip 34 can be adjusted sidewise in slot 39, as shown in Fig. 6 and can be tightened in any position by screw 40. Screws 41 and 42 are for connecting the thermostat in the circuit controlled and screw 43 is connected to lever 27 by a small wire loop 44, so as to overcome possible electrical resistance through pivot 28. A hole 45 is provided for the wires of the controlled circuit.

Figs. 8, 9 and 10 illustrate an alternative way of obtaining the same results as by the means described in relation to Figs. 5, 6 and 7. Instead of lever 46 being forced upward by a spring clip, wipers 47 and 48 bear on the reverse sides of insulated bearing 49, which encircles pivot 50, providing the necessary motion. As that part of bearing 49 which is in contact with wipers 47 and 48 must be of insulating material, it is such as to provide the needed friction. That part of bearing 49 against which wiper 48 is engaged, may be of a different diameter than the part against which wiper 47 is engaged, thereby compensating for any difference in the amplitude movement between the upper and lower arms of strip 51; or it may be dispensed with entirely. Adjusting screw 52 furnishes means for opening contacts 53 and 54, if the lowering temperature falls below the predetermined point, the end of screw 52 being forced against the insulated end of counterweight 55, overcoming the friction of wipers 47 and 48 on bearing 49. Contacts 53 and 54 correspond to 32 and 33, counterweight 55 to 29, strip 51 to 26, screws 56 and 57 to 41 and 42 and hole 58 to 45. Fig. 10 shows clearly the relative positions of the parts concerned. The tension on strip 51 can be varied by tightening or loosening adjusting screw 59, thereby changing the temperature point at which contacts 53 and 54 will engage. Saddle 60 operates differently from saddle 30 in Figs. 5, 6 and 7. Instead of lever 46 being held loosely in saddle 60, it is fastened rigidly thereto by a screw and the adjustment of contacts 53 and 54 is made by screw 61, which is threaded into the top of saddle 60. A sliding piece 62, which is slotted under screw 63, is guided on spring wire 64 which is fastened to adjusting screw 65, by means of eye 66 (shown only in Fig. 9 and Fig. 10). Saddle 60 and piece 62 can be adapted to the thermostat shown in Figs. 5, 6 and 7.

Fig. 10 shows an adaptation which can be used with the thermostats shown in Figs. 5 to 10. Strip 67 would correspond to strip 26 or 51. Saddle 68 is the same as 60. The end of lever 69, which corresponds to 27 or 46, is turned up at a right angle and the distance between saddle 68 and contacts 70 and 71 is increased. Sliding piece 72 is slotted under screw 73 and the vertical arm of angle piece 74 is confined between two pins 75 and 76, projecting to the rear from piece 72, as shown by dotted lines. Pins 75 and 76 slide up and down freely on piece 74 as strip 67 distorts. The movements of piece 74 can be limited by adjusting screws 77 and 78, which are adapted to engage strip 67. The wedge shaped end of piece 72 is adapted to slide under screw 79 when the vertical arm of piece 74 moves to the right and bears against pin 76, caused by the pressure of strip 67 against screw 77. Pin 75 is adapted to bear against the other side of the vertical arm of piece 74, so that it is moved to the left by the pressure of strip 67 against screw 78 and the wedge shaped end is removed from underneath screw 79. Piece 74 moves freely around fulcrum screw 80, but remains in any position it is placed in, on account of its vertical arm bearing against either pin 75 or 76 and piece 72 being movable only by the pressure of strip 67 against either screw 77 or 78.

Having detailed the parts of the invention, its operation will now be described. Referring to Figs. 1 and 2, screw 8 or screw 11, or both, are so loosened or tightened that the free end of strip 6 is brought but lightly in contact with adjusting screw 8, when the temperature is say seventy degrees and strip 1 is adjusted by screw 12, so that contact 3 just disengages contact 7. When the temperature falls sufficiently, contacts 3 and 7 engage and close the wire circuit connected to screws 9 and 10. Though strips 1 and 6 are so mounted as to distort in the same direction, this engagement occurs, due to the lesser relative mass of strip 1, and its consequent quicker response to any temperature change.

The circuit mentioned will be opened by the thermostat as soon as the temperature change in the controlled area reverses itself and begins to rise; it is not dependent on the temperature first having reached seventy degrees, the circuit closing point. This is due again, to the fact the lesser mass of strip 1 is responsive to temperature changes quicker than strip 6. Figure 1, shows with exaggerated distances, for sake of clearness, the positions of strips 1 and 6 when the circuit is so opened. This effect is produced in order to prevent "over-running" or "over-riding", which means that when heat is sent to a controlled area and is only cut off when the temperature actually reaches seventy degrees, or the predetermined circuit closing point, as there is a considerable lag before the heat is reduced in the conveyors and radiators, the actual temperature of the controlled area may rise to seventy-four degrees or even higher and then only, slowly fall to the set point of seventy degrees.

Should the temperature change, described in the preceding paragraph, not be sufficient to bring the controlled area back to the set point of seventy degrees, then as soon as the rise in temperature stops, strip 1 also stops its upward distortion and strip 6, distorting slower, catches up with strip 1 and contacts 3 and 7 re-engage. This causes more heat to be released and the temperature again rises and the described cut-off action is repeated. This action may occur several times, under unusual conditions, until finally the free end of strip 6 engages screw 8, preventing its further distortion upward and definitely separating contacts 3 and 7. The impulses of heat delivered in this way do not permit "over-running", as they are of comparatively short duration and the last cut-off will occur before seventy degrees has been reached, as strip 1 continues its upward distortion when strip 6 has been checked by screw 8.

Another defect in the ordinary thermostat is the production of what is called "cold seventy", which means the formation of stratas of air of different temperatures and densities in the controlled area; the strata at the level of the thermostat only is seventy degrees, while those lower down are considerably less. This effect is due to the length of time between heat impulses, which in turn is due to the operating differential compulsory in all other thermostats. Such stratas are caused by a lack of circulation of air in the controlled area, due to infrequent heating of the radiating system. The short but more frequent heat impulses produced by the use of the described super-sensitive thermostat, overcomes this trouble completely. Such frequent heat impulses, of shorter duration, also represent a notable economy in the consumption of fuel.

Heretofore, a disadvantage in the use of a plurality of thermostats in an apartment house or an office building, has been that a tenant, on a cold day, would cut off his radiators or leave windows wide open, thereby causing the heat control device to remain in operation and heat sent up, in a vain effort to bring the abnormally chilled area up to the set point, and only succeeding in overheating the remainder of the building. The thermostat shown in Figure 1 overcomes this difficulty in the following simple manner: The downward distortion of the free end of strip 1 is limited by the insulating nut of screw 4, which can be so adjusted that strip 1 is stopped at a temperature of say sixty-five degrees. Therefore, when any controlled area of a given thermostat is lowered to a temperature of sixty-five degrees, contacts 3 and 7 are disengaged and that particular thermostat is removed from any control over the source of heat, and the normal heating of the building continues under the control of the remaining thermostats therein. When the windows are closed or the radiators opened in the abnormally chilled area, the heat received, governed by the other thermostats, will raise the temperature to sixty-five degrees and restore to control the thermostat of the affected area. A similar effect, obtained by different means, is produced by the thermostats described hereinafter in relation to Figs. 5 to 10. The type of thermostat shown in Figs. 3 and 4, is only used when a special night temperature, lower than the day temperature, is desired or when the automatic cut-out feature is not wanted. It operates similarly in every way to the thermostat shown in Figs. 1 and 2, except that it has no limiting screw 4. When the controlled area temperature has lowered to a point, such as sixty degrees, contacts 17 and 18 engage, closing a circuit through the wires connected thereto through screws 19 and 21 and this circuit can control the night temperature means used. In all multi-tenanted installations, one thermostat of the type shown in Figs. 3 and 4 should be installed in the superintendent's apartment or office, or in any area accessible to the one in charge of the building or heating. This is done so as to assure the holding of the special night temperature and its raising to the day temperature in the morning; the thermostats installed in the tenants' areas, cutting in as their areas reach sixty-five degrees.

Referring to Figs. 5, 6 and 7, if a very sensitive control was desired, contacts 32 and 33 would normally be brought closer together than shown, by loosening screw 31. The position of all the parts shown can be assumed as that of the thermostat just prior to closing the circuit at the predetermined point. As in Figs. 1 to 4, the lower arm of strip 26 distorts upward and the upper arm downward, when influenced by a falling temperature. Spring clip 34 is adjusted, by means of screw 38, so that any predetermined further fall in temperature will engage the clip with insulating piece 35 which is attached to switch lever 27. Lever 27 is forced upward by the movement upward of the lower arm of strip 26 and contacts 32 and 33 are engaged. Inasmuch as the upper arm of strip 26 simultaneously moves downward, the circuit controlled by the thermostat can be closed very rapidly and by a very slight temperature change. Should the controlled area temperature continue to fall, piece 35 is forced further down into V shaped clip 34. Just as soon as the temperature starts to rise, clip 34 is lowered and pulling downward on piece 35, due to the friction therebetween, contacts 32 and 33 are immediately separated, the separation being hastened by the simultaneous rising of contact 32. In this way the thermostat controlled circuit is opened prior to the raising of the controlled area temperature to the circuit closing point. As saddle 30 only allows contacts 32 and 33 to barely disengage, the continued rising of contact 32 pulls lever 27 upward out of engagement with clip 34, as the distortion of strip 26 when cooled overcomes the frictional effect of clip 34 against piece 35. Prior to reaching the circuit closing point, should the rising temperature stop and start to fall again, then contacts 32 and 33 are immediately re-engaged and the process will be repeated until finally the predetermined temperature point is again reached and clip 34 is disengaged from piece 35. Should the temperature, in the first place, have continued to fall, then finally spring piece 36, which is wider than piece 35, is forced into clip 34, springing the sides apart and allowing piece 35 and lever 27 to fall, disengaging contacts 32 and 33. The temperature at which such disengagement occurs is regulated by screw 37. In Fig. 7 the inclination of the sides of clip 34 is exaggerated, for sake of clearness in the drawings, as is also the thickness of the side pieces. The pressure exerted by the clip sides on piece 35 should be very slight, as but very little friction is required, due to the balancing almost of lever 27 by counterweight 29. As piece 35 is disengaged from clip 34 at any temperature above the predetermined point, any fluctuations of temperature do not close contacts 32 and 33.

Referring to Figs. 8, 9 and 10, the functioning of lever 46 is exactly the same as lever 27, its motion only being imparted differently. Lever 46; mounted on bearing 49 which is normally adapted for immediate engagement with wipers 47 and 48, when the predetermined temperature point has been reached, as shown in the drawings; is moved upward if the temperature continues to fall. This movement is due to ascending wiper 47 pressing against the left side of bearing 49 and descending wiper 48 bearing against the right side. When contacts 53 and 54 engage and further movement upward of lever 46 is prevented, should the controlled area temperature continue to fall, bearing 49 rotates against wipers 47 and 48 in the reverse direction, as the distortion of strip 51 overcomes the frictional effect of wipers 47 and 48. But slight pressure is needed against bearing 49, on account of counterweight 55 almost balancing lever 46. When the temperature rises, as the upper and lower arms of strip 51 raise and lower respectively, wipers 47 and 48 reverse the motion imparted to bearing 49 and contacts 53 and 54 are immediately disengaged, regardless of the actual temperature. Fig. 10 shows clearly the action of the parts concerned. The temperature at which contacts 53 and 54 engage is regulated by adjusting screw 59, which varies the tension on strip 51, so that wipers 47 and 48 are removed from contact with bearing 49 at any temperature above the set point, but establish contact therewith at the desired temperature; as shown in the drawings, where contact has just been established and where lever 46 will be forced upward by any further temperature drop. Should the controlled area temperature continue to fall beyond another set point, then screw 52 is forced against the insulated end of counterweight 55, the frictional effect of wipers 47 and 48 is overcome, lever 46 is forced downward and contacts 53 and 54 are disengaged. There are cases where the removal of control of a thermostat when the controlled area is abnormally chilled is not desired, but it is desired to maintain continuous heating of the area, should the temperature drop very low and the described intermittent heating only after the temperature has risen to a predetermined point lower or the same as the circuit closing point and the thermostats shown in Figs. 5 to 11 can be arranged to provide either of these effects, which can be changed from one to the other, as desired. To do this, screw 52 is loosened or removed, screw 63, which would have been tightened, is loosened and screw 65, which would have been loosened is tightened. Then, as saddle 60 rises with lever 46 and the wedge shaped end of piece 62 as it descends on spring wire 64 is forced under screw 61, lever 46 cannot be made to fall when the temperature starts to rise, until the upper arm of strip 51 has reached the predetermined temperature point, which is regulated by screw 65 around which wire 64 is fastened, when sliding piece 62 will be pulled back and lever 46 allowed to fall. The adjustment of screw 65 would generally be that of the set night temperature, if used, so that in the morning, when the day temperature is in effect, instead of the control circuit being opened as soon as the temperature started to rise, as hereinbefore described, it would remain closed until the predetermined point which governs the release of screw 61 is reached. During the day operation, should the controlled area temperature fall below this set point, the same thing would occur and by this means the automatic opening of the control circuit as soon as the temperature starts to rise, can be limited to that between any desired temperature points immediately below the set circuit closing point. For instance, if the controlled area temperature is set at seventy degrees, screw 65 can be set so that the circuit will not be opened by rising temperature until sixty-five or sixty-eight degrees is reached.

Referring now to Fig. 11, the alternative cut-off preventive means shown performs the same function as that just described and it is adapted for use with the thermostat shown in Fig. 5 or 8. Screw 77 is adjusted so that it engages strip 67 and forces piece 72 under screw 79 at the predetermined temperature point. On the reverse movement of strip 67, when it reaches another predetermined point, screw 78, which was lowered with the upper arm of piece 74, is forced upward, sliding piece 72 is forced to the left, screw 79, saddle 68 and lever 69 all fall and the circuit is opened at contacts 70 and 71. The cut-off preventive means shown in Fig. 11 allows a more precise operating differential to be provided, on account of screws 77 and 78, than the form shown in Fig. 8. The increased length between contacts 70 and 71 and saddle 68 of lever 69, is to obtain springiness of the free end of lever 69, so as to insure contact while piece 72 is under screw 79. Screws 37 or 52 would be loosened or removed if this cut-off preventive means is used and similarly, screws 77 and 78 would be loosened or removed when the cut-off controlled by screws 37 or 52 was used, the one thermostat providing alternative operative means, which can be changed after installation is made.

From the description given of Figs. 5 and 8, it will be noted that there are no stops of any kind limiting the free movement of bimetallic strips 26 and 51. Regardless of whether the controlled area temperature goes far above or below the set point of the thermostat, free movement is always assured, as clip 34 or wipers 47 and 48 offer but slight frictional impedance thereto. This overcomes a thermostat defect which has been found by experience; namely, the molecular change which occurs in a bimetallic strip when checked by a rigid stop for long periods in summer or in winter if there is no heat being used. This molecular change varies the set operating point and entails new adjustments.

It will readily be understood that strips 1 and 6, 14 and 15, 26 and 51, and switch levers 27 and 46, could be formed and operated in other ways than those shown, without departing from the principles involved. I merely prefer the forms shown in the drawings, when the most sensitive thermostat is desired, as the mechanical movements concerned are augmented, space is conserved and a large area of the bimetallic strips is in contact with the surrounding air. Also, that contacts such as 17 and 18 in Figure 2, could be added to the type of thermostat shown in Figs. 5 and 8, and such use is contemplated.

It is therefore to be understood that the present invention is not limited to its illustrated embodiment, but may be otherwise embodied within the scope of the claims.

Having thus described the invention and its operation, what I claim as new is:

1. A thermostat comprising two members movable toward and away from each other responsive to temperature variations, a pivoted lever arranged between said two members with one end adjacent the end of one of said members, co-operating contacts on the ends of said member and lever, means tending to maintain said contacts in spaced relation, means to limit movement of said contacts away from each other, and means operative upon predetermined movement of said members toward each other to bring said contacts into engagement and also establish frictional connection between said lever and the remaining member.

2. A thermostat comprising two members movable toward and away from each other responsive to temperature variations, a pivoted lever arranged between said two members with one end adjacent the end of one of said members, co-operating contacts on the ends of said member and lever, means tending to maintain said contacts in spaced relation, means to limit movement of said contacts away from each other, means operative upon predetermined movement of said members toward each other to bring said contacts into engagement and also establish frictional connection between said lever and the remaining member, and means for rendering inoperative said frictional inter-connection upon additional movement of said members toward each other.

3. A thermostat comprising a U-shaped bimetallic strip, a pivoted lever arranged between the arms of said strip with one end adjacent the end of one of said arms, co-operating contacts on said arm and lever, means tending to maintain said contacts in spaced relation, means to limit movement of said contacts away from each other, and means operative upon predetermined movement of said arms toward each other to bring said contacts into engagement and also establish frictional inter-connection between said lever and the remaining arm.

4. A thermostat comprising a U-shaped bimetallic strip, a pivoted lever arranged between the arms of said strip with one end adjacent the end of one of said arms, co-operating contacts on said arm and lever, means tending to maintain said contacts in spaced relation, means to limit movement of said contacts away from each other, means operative upon predetermined movement of said arms toward each other to bring said contacts into engagement and also establish frictional inter-connection between said lever and the remaining arm, and means for rendering inoperative said frictional inter-connection upon additional movement of said arms toward each other.

HUBERT S. TURNER.